(12) United States Patent
Riffle

(10) Patent No.: US 10,889,313 B2
(45) Date of Patent: Jan. 12, 2021

(54) OCCUPANT DIVIDER STRUCTURE FOR A STROLLER

(71) Applicant: Janelle Hernandez Riffle, Oconomowoc, WI (US)

(72) Inventor: Janelle Hernandez Riffle, Oconomowoc, WI (US)

( * ) Notice: Subject to any disclaimer, the term of this patent is extended or adjusted under 35 U.S.C. 154(b) by 0 days.

(21) Appl. No.: 16/262,129

(22) Filed: Jan. 30, 2019

(65) Prior Publication Data
US 2019/0232993 A1    Aug. 1, 2019

Related U.S. Application Data

(60) Provisional application No. 62/623,806, filed on Jan. 30, 2018.

(51) Int. Cl.
*B62B 9/12* (2006.01)
(52) U.S. Cl.
CPC ............ *B62B 9/12* (2013.01); *B62B 2202/42* (2013.01); *B62B 2501/00* (2013.01)
(58) Field of Classification Search
CPC .................................. B62B 9/12; B62B 7/008
USPC ......................... 296/97.21, 24.46; 280/47.38
See application file for complete search history.

(56) References Cited

U.S. PATENT DOCUMENTS

| | | | |
|---|---|---|---|
| 5,054,837 A * | 10/1991 | Chapman | B60N 2/28 160/351 |
| 9,440,669 B2 * | 9/2016 | Poslowski | B62B 7/008 |
| 10,086,724 B2 * | 10/2018 | Geraty | B60N 2/90 |
| 2012/0118516 A1 * | 5/2012 | Macauley | B62B 7/008 160/351 |

* cited by examiner

*Primary Examiner* — Dennis H Pedder
(74) *Attorney, Agent, or Firm* — Patrick M. Bergin

(57) ABSTRACT

An occupant divider structure for a child's stroller utilizes a Poly(methyl methacrylate) (PMMA) sheet affixed by two releasable clamps to a bar extending vertically from a slotted insert receptacle that extends upwardly from the seat back center between two "side-by-side occupant seats in a molded stroller frame. The shape of the PMMA sheet is designed so as to prevent contact by and between infants/toddlers occupying adjacent seats. The clamping mechanisms are designed to allow easy release from the mounting bar for removal thereof from the stroller.

2 Claims, 4 Drawing Sheets

OCCUPANT DIVIDER STRUCTURE FOR A STROLLER

FIELD OF THE INVENTION

The present invention relates generally to a divider to be used within a stroller for use in transporting young children, and, more particularly, to a divider structure between the adjacent seats that will restrict contact by and between the children.

BACKGROUND OF THE INVENTION

Strollers for transporting young children are widely available, and typically come in two varieties—collapsible and non-collapsible versions. The collapsible design allows for folding the stroller into a position to allow ease of storage. The non-collapsible design is ordinarily constructed with seats molded into the stroller frame. Strollers are operated by pushing the stroller manually after the children are secured into their seats.

On occasion, in the course of operating the stroller, children will reach across the stroller to the adjacent seat and make physical contact with the child seated in the adjacent seat. This contact may at times be innocuous, but at other times may result in annoyance or actual injury involving poking, punching or the pulling of hair. There currently is no product designed to prevent such contact. Caregivers are charged with the duty of maintaining the safety of the children being transported. The ability of children to make contact with another child presents an obvious impediment to a caregiver's ability to properly protect the children. The solution to this problem with currently commercially available strollers is to create a vertical divider between the children spanning the entire length of the seated body, inhibiting a child's ability to touch his/her seated neighbor.

SUMMARY OF THE INVENTION

It is an object of this invention to overcome the disadvantages of the prior art by providing a split occupant dividing structure that prevents contact between children seated next to one another in a stroller.

It is a feature of this invention that the dividing structure is constructed of a PMMA material that allows children and the caregiver(s) the ability to see one another at all times.

It is another feature of this invention that the mounting bar and the entire unit, is removable such that it need not be utilized in instances where non-aggressive children are seated It is an advantage of this invention that the divider is of a thickness to withstand tactile pressure exerted by a child under the age of 3½ years old.

It is still another feature of this invention that assembly is affixed to the mounting bar by means of two releasable mounting clamps designed to reasonably prevent lateral rotation of the assembly when in use.

It is another advantage of this invention that the stroller geometry is of a shape that will prevent contact of the upper and lower bodies of occupants in adjacent seats of the stroller.

These and other objects, features and advantages are accomplished according to the instant invention by providing An Occupant divider structure for a child's stroller utilizes a PMMA acrylic plastic sheet affixed by two releasable clamps to a bar extending vertically from a slotted insert receptacle that extends upwardly from the seat hack center between two "side-by-side occupant seats in a molded stroller frame. The shape of the PMMA sheet is designed so as to prevent contact by and between infants/toddlers occupying adjacent seats.

DETAILED DESCRIPTION OF THE INVENTION

Figure 1:
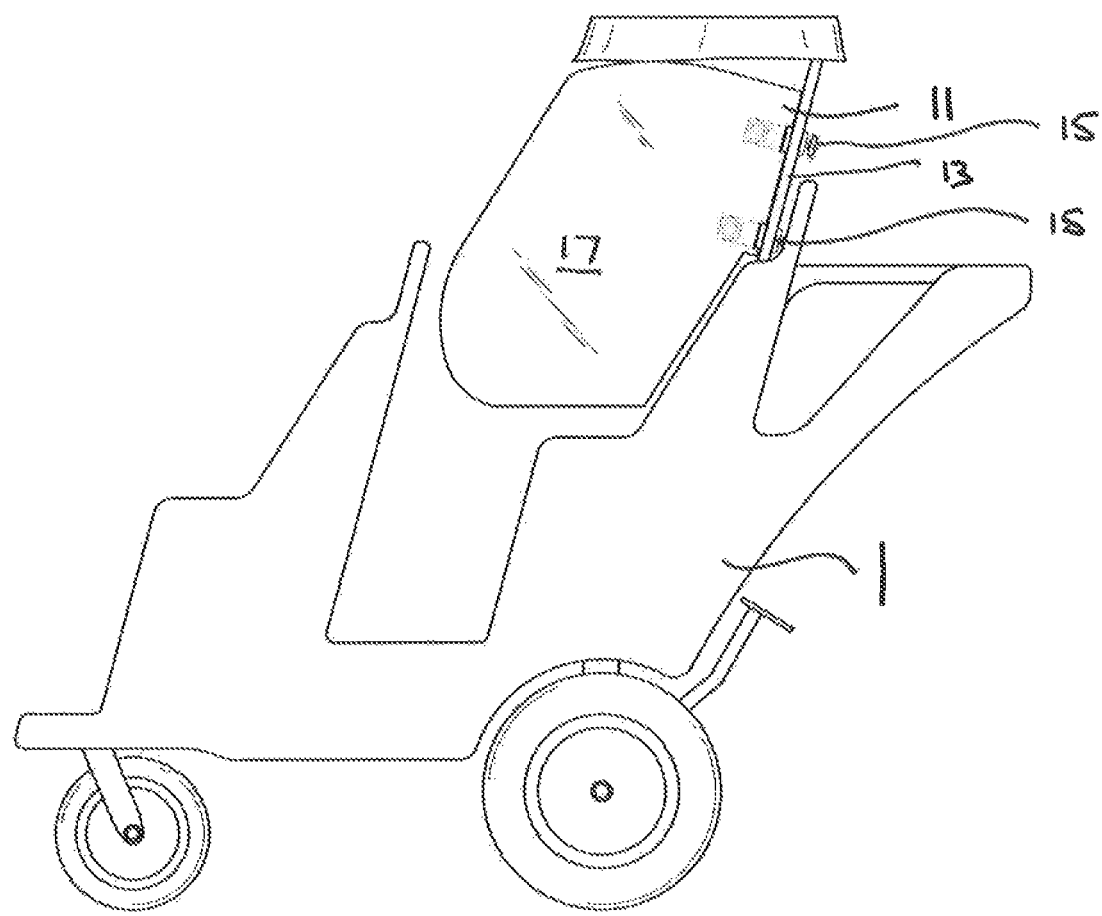
FIG. 1 is a side elevational view of the stroller showing the stroller divider assembly installed on a stroller.
Figure 2:
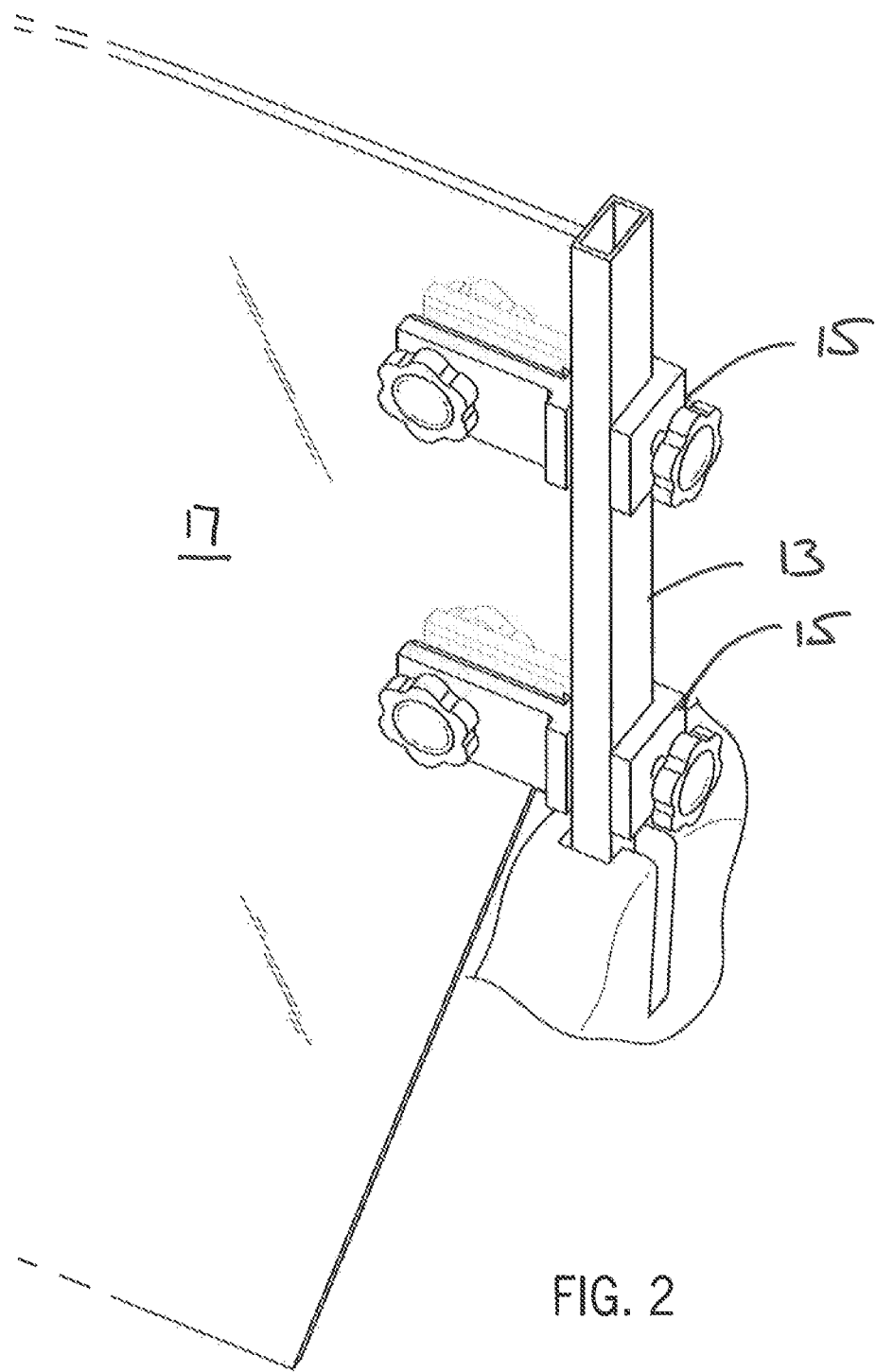
FIG. 2 is a side and top perspective view of the stroller divider assembly.
Figure 3:
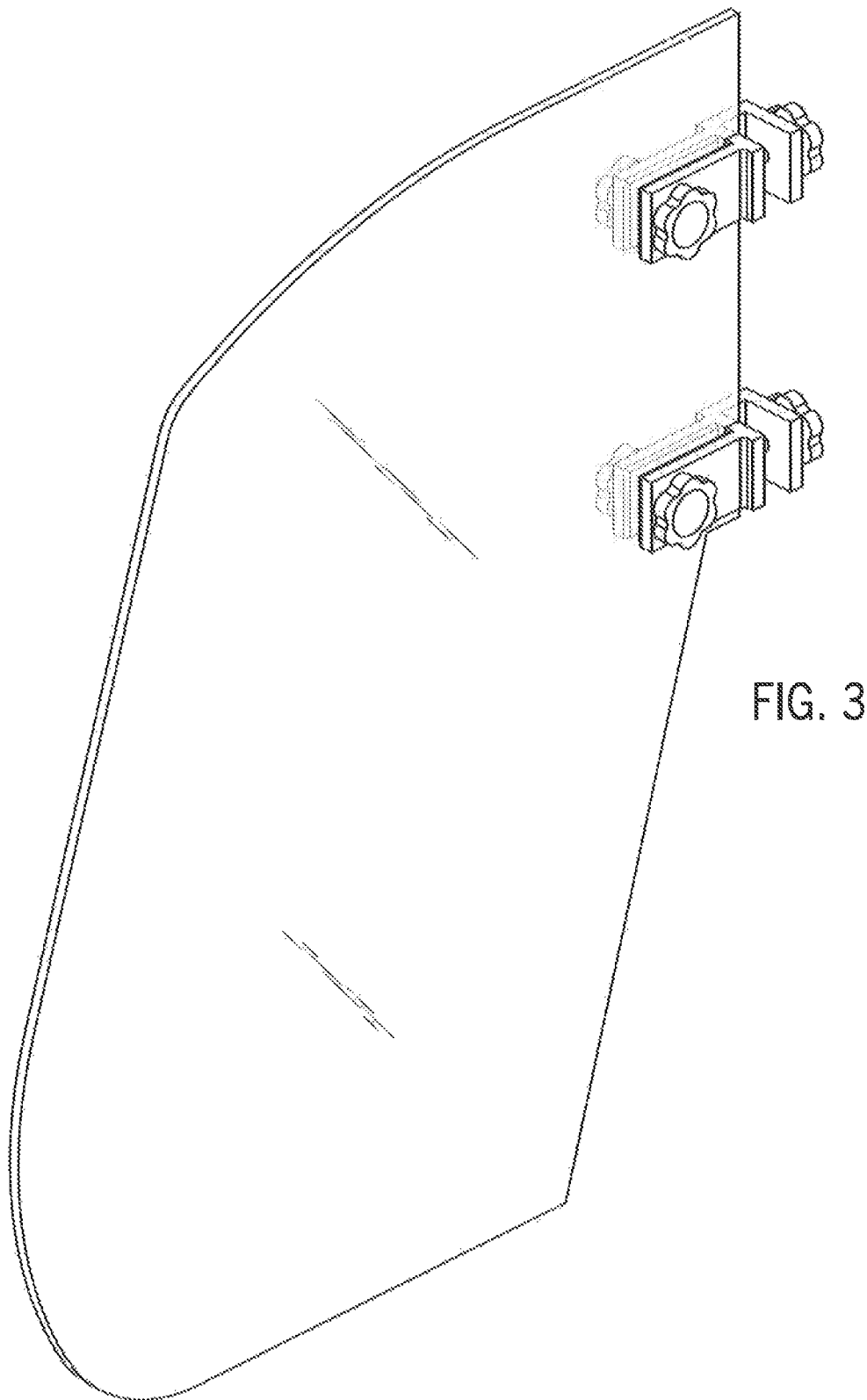
FIG. 3 is an additional top and side perspective view of the stroller divider assembly.
Figure 4:
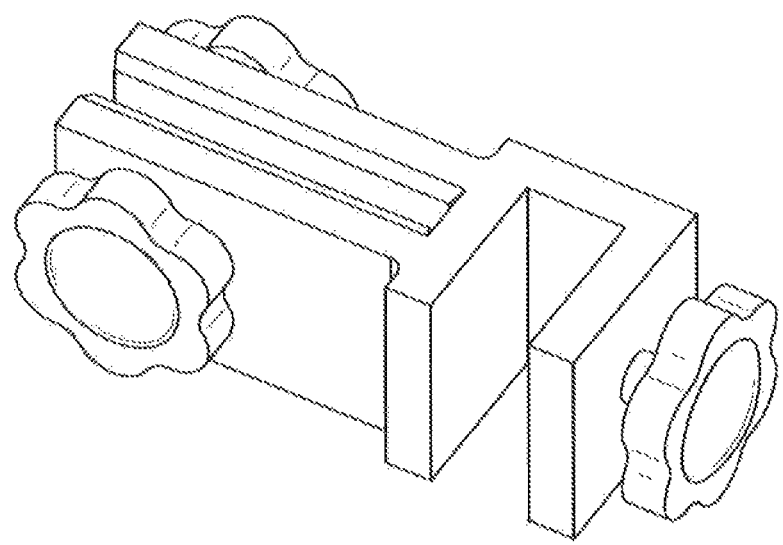
FIG. 4 is a top and side perspective view of the clamp used in the stroller divider assembly.
Figure 5:
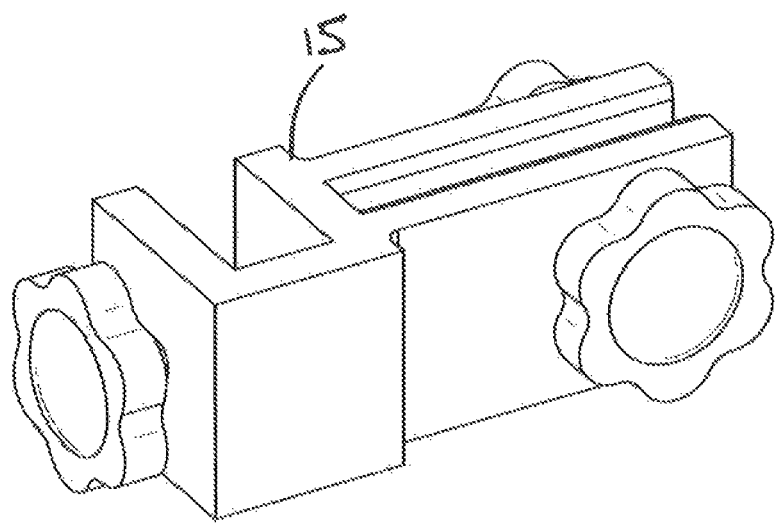
FIG. 5 is a back and side perspective view of the clamp used in the stroller divider assembly.

Now referring to the drawings, wherein like reference numerals refer to like elements throughout, FIG. 1 shows the occupant divider 11 of the claimed invention as installed on stroller 1. In more detail, occupant divider 11 comprises a vertical bar 13 affixed to stroller 1. Vertical bar 13 further comprises to releasable clamps 15. Releasable clamps 15 are used to secure a polymethyl methacrylate (PMMA) acrylic plastic sheet 17 in a vertical position to be used to divide the occupants of a stroller or the like.

Although a structure contemplated by the inventors for carrying out the invention is disclosed above, practice of the invention disclosed herein is not limited thereto. It will be manifest that various additions, modifications, and rearrangements of the features of the disclosed invention may be made without deviating from the spirit and scope of the underlying inventive concept.

What is claimed is:

1. A divider for the separation of child occupants of a stroller for transporting children with adjacent seats comprising:
   a polymethyl methacrylate ("PMMA") plastic sheet;
   a mounting bar, the mounting bar being insertable into a slot molded into the stroller frame between the adjacent seats of the stroller;
   a plurality of releasable mounting clamps used to attach the PMMA plastic sheet to the mounting bar, the releasable mounting clamps being designed to prevent lateral rotation of the PMMA plastic sheet so as to
   prevent personal contact between the occupants of adjacent stroller seats.

2. The divider for the separation of child occupants of a stroller of claim 1 wherein said PMMA plastic sheet used to separate the child occupants is configured so as to prevent contact of the upper and lower bodies of the child occupants in adjacent seats of the stroller.

* * * * *